United States Patent

[11] 3,548,755

| [72] | Inventor | Richard L. Lich<br>Town and Country, Mo. |
|---|---|---|
| [21] | Appl. No. | 740,302 |
| [22] | Filed | June 26, 1968 |
| [45] | Patented | Dec. 22, 1970 |
| [73] | Assignee | General Steel Industries, Inc.<br>Granite City, Ill.<br>a corporation of Delaware |

[54] RESILIENT RAILWAY VEHICLE TRUCK SUSPENSION
14 Claims, 5 Drawing Figs.

[52] U.S. Cl. .................................................. 105/199,
105/136, 105/197, 105/200, 105/202, 105/206,
105/208.1, 267/3
[51] Int. Cl. ....................................................... B61f 3/04,
B61f 5/08, B61f 5/10
[50] Field of Search............................................ 105/197,
197A, 197B, 199, 200, 136, 202, 206, 208.1;
267/3

[56] References Cited
UNITED STATES PATENTS

| 2,636,451 | 4/1953 | Watter ......................... | 105/199 |
| 2,887,069 | 5/1959 | Lich ............................. | 105/197(B)X |
| 2,981,208 | 4/1961 | Sinclair ........................ | 105/197 |
| 3,262,693 | 7/1966 | Hirst............................. | 105/197X |
| 3,403,638 | 10/1968 | Hirst.............................. | 105/199 |

Primary Examiner—Arthur L. La Point
Assistant Examiner—Howard Beltran
Attorney—Bedell and Burgess ABSTRACT: Railway vehicle trucks in which light weight and simplicity are achieved by eliminating a bolster between the truck frame and car body. The car body is supported directly on upright spring devices on the sides of the truck frame. Each spring device has two parts in series, one part being yieldable in shear only transversely of the truck to accommodate limited lateral movement of the body thereon, while the other part is yieldable longitudinally of the truck to accommodate swivel. For permitting lateral and swivel movements of the truck relative to the supported body, while limiting relative longitudinal movements, the body underframe has a depending element at the center of the truck, which is connected to the truck by transverse vertical pads of elastomeric material which yield in shear to accommodate lateral and vertical movements of the body on the supporting spring devices while opposing relative longitudinal movements of truck and body by resistance to compression.

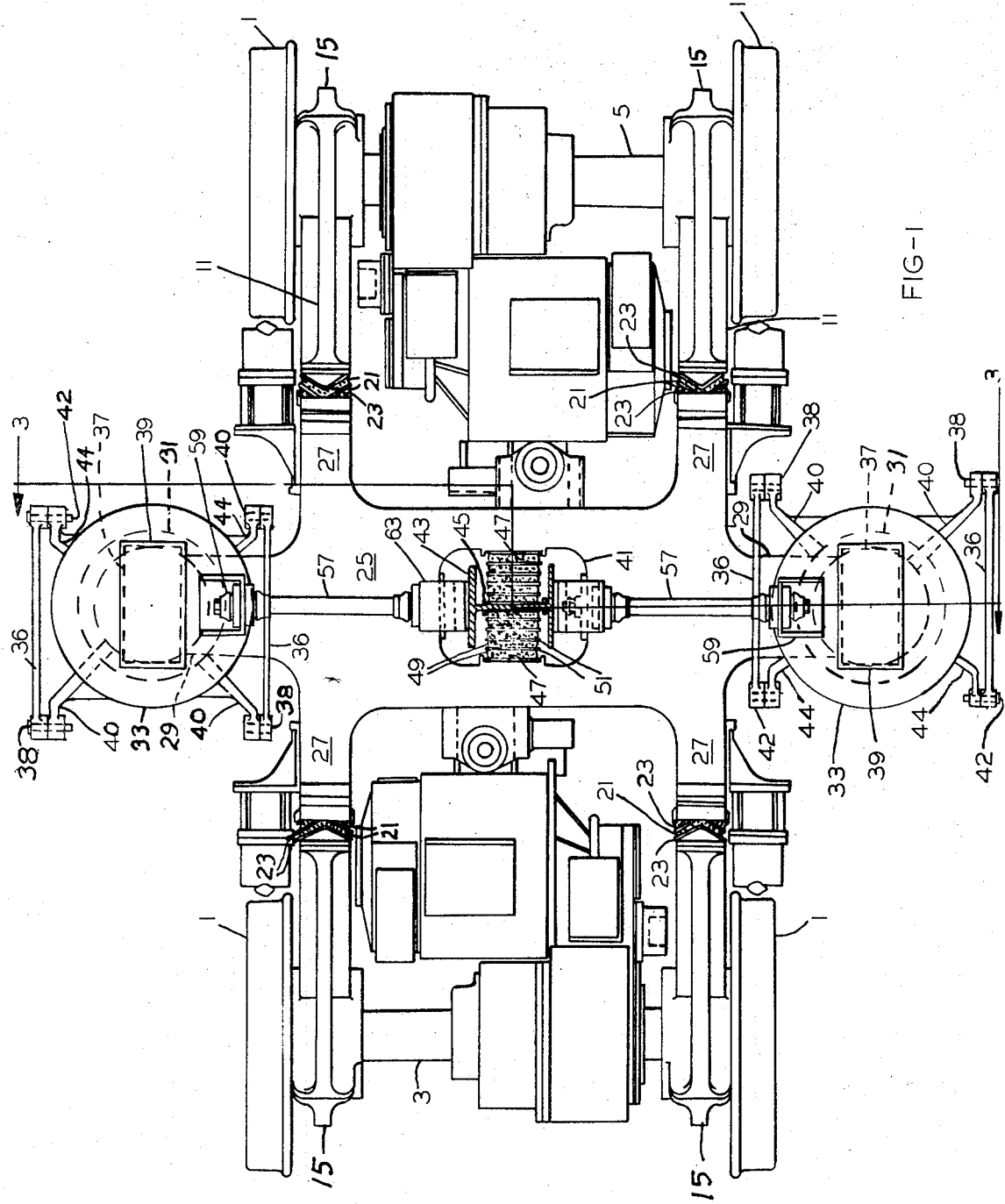

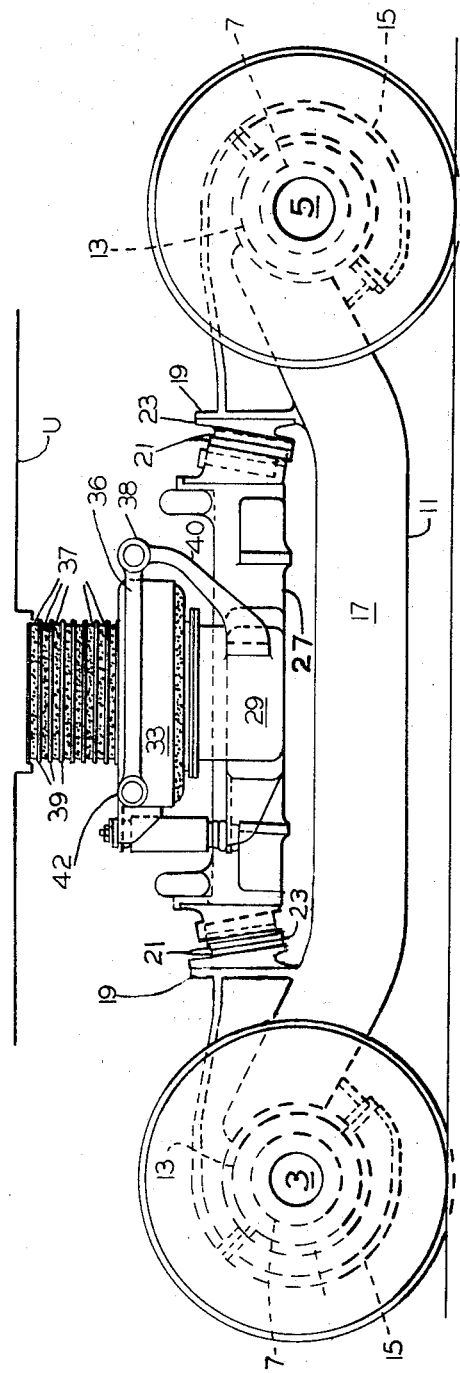
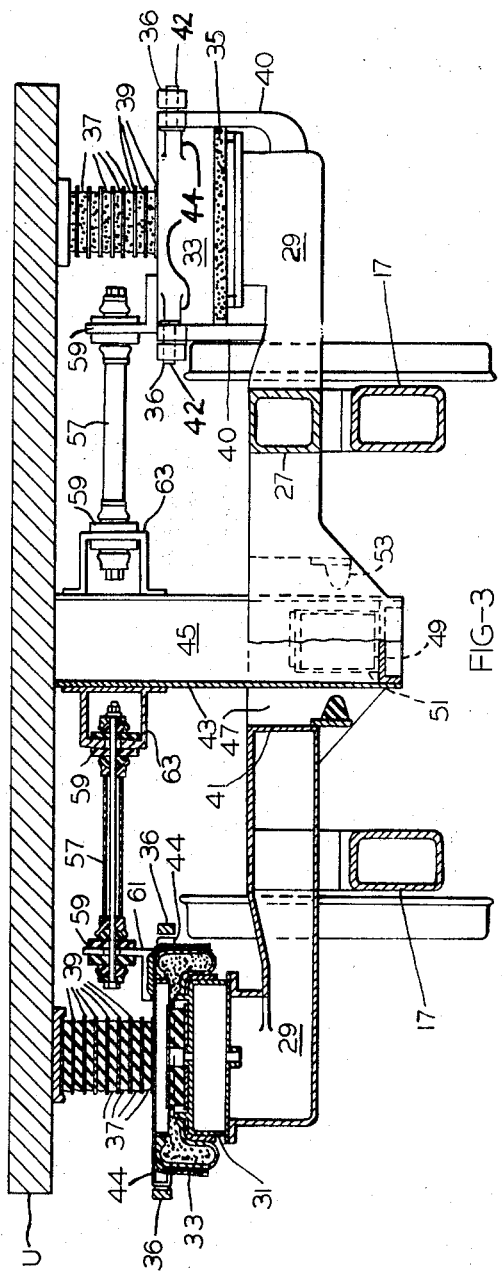

PATENTED DEC 22 1970

INVENTOR
RICHARD L. LICH
BY Bedell & Burgess
ATTORNEYS

3,548,755

RESILIENT RAILWAY VEHICLE TRUCK SUSPENSION

FIELD OF THE INVENTION

The invention relates to railway rolling stock and includes a railway vehicle truck of the bolsterless type in which spring devices supported on the sides of the truck framing directly support the vehicle underframe which is connected to the truck to swivel about a vertical axis at the truck center, truck swivel and lateral movement of the body on the truck, as well as vertical movement of the body on the truck being accommodated through yielding of the body support springs.

DESCRIPTION OF THE PRIOR ART

Conventional railway passenger vehicle trucks are usually provided with a laterally movable spring-supported bolster, on which is mounted a pivot center plate to swivelly support the vehicle body. This arrangement, though practical, is disadvantageous in that it requires a heavy load-supporting truck bolster. Previously it has been suggested that the bolster be eliminated and that body support springs be seated directly on the truck frame and support the body directly, lateral and swivel movements being accommodated by horizontal deflection of the springs. The requirement of such greater horizontal spring deflection and reduced horizontal resistance for swivel than for lateral movement has created serious problems in utilizing springs in this way.

SUMMARY OF THE INVENTION

The invention provides a bolsterless truck in which the body support spring devices are each in two parts, at least one of which is free to yield in shear solely longitudinally of the truck to accommodate swivel movements, while the other part is arranged to yield in shear transversely to the truck to accommodate lateral movements, thereby providing the large shear deflection necessary to accommodate swivel without a corresponding reduction in the resistance of the springs to lateral movement, so that lateral movement of the body on the truck can be properly controlled.

BRIEF DESCRIPTION OF THE DRAWINGS

FIG. 1 is a plan view of a railway car truck embodying the invention.

FIG. 2 is a side elevation view of the truck illustrated in FIG. 1.

FIG. 3 is a transverse vertical sectional view along line 3–3 of FIG. 1.

DESCRIPTION OF THE PREFERRED EMBODIMENTS

Figure 4:
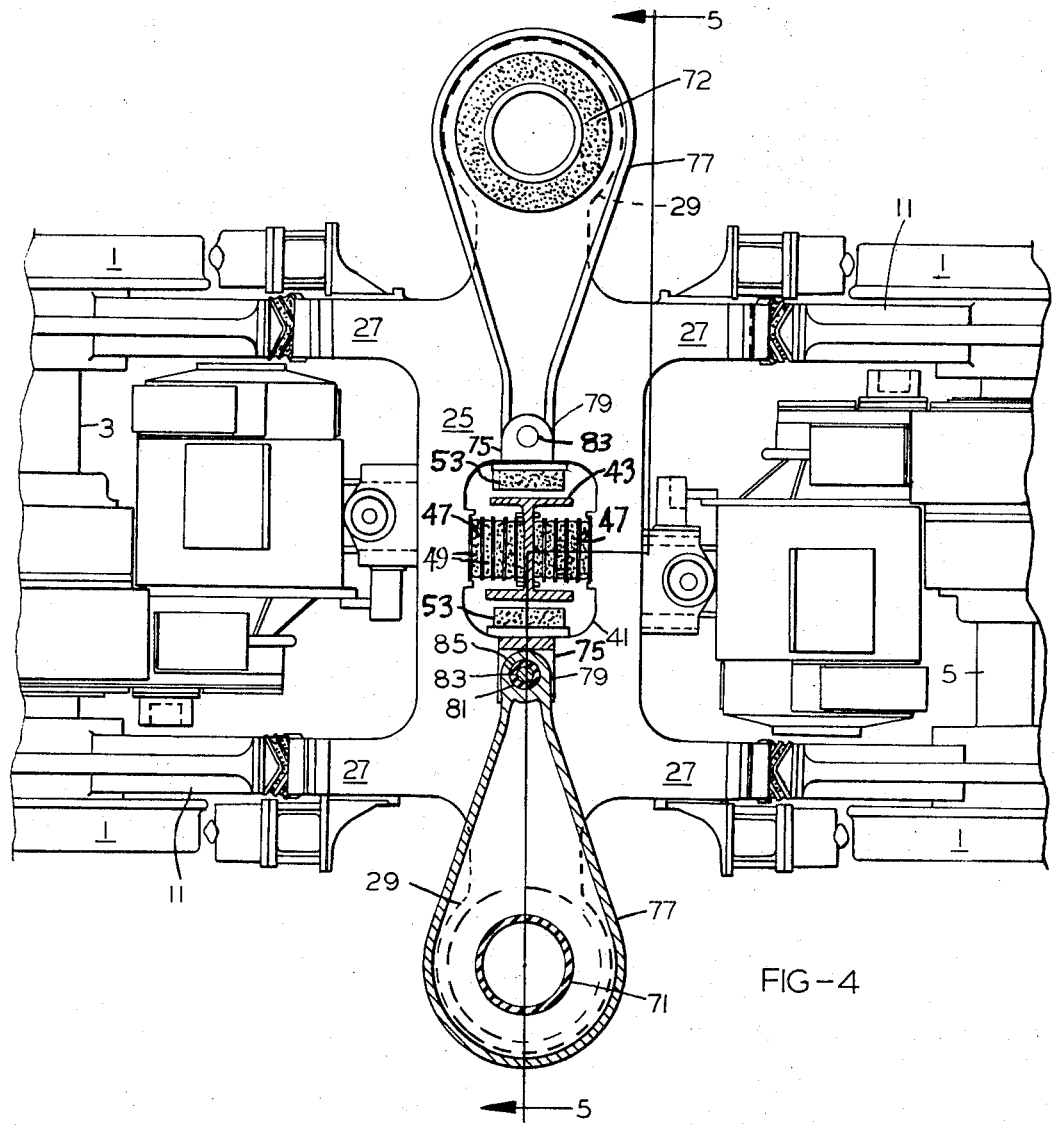
FIG. 4 is a fragmentary plan view of a truck partially horizontally sectionalized along line 4–4 of FIG. 5 embodying a modified form of the invention.

In FIGS. 1—4 the numeral 1 refers to flanged railway wheels, mounted in spaced pairs on the ends of spaced axles 3 and 5. Axles 3 and 5 rotatably mount journal boxes 7 inwardly of wheels 1. Transversely spaced longitudinally extending side frames 11 are supported at their ends, which are formed with semicircular recesses of channel cross section, on journal boxes 7. Journal boxes 7 are locked in recesses 13 by semicircular end clamps 15 of similar cross section. The intermediate portions 17 of side frames 11 are depressed to a lower level than the end portions and, adjacent to the end portions, are formed with upstanding transverse abutments 19, on which are supported longitudinally inwardly facing chevron spring devices each comprising a plurality of V-shaped rubber pads 21 interleaved by and bounded by metal plates 23. Chevron springs 21, 23 are slightly inclined in opposite directions longitudinally of the truck. For tying the side frames together and maintaining them and the axles in trammed relation, a rigid main frame comprising a transverse center transom member 25 and longitudinally extending side members 27 seated at their ends on chevron spring devices 22, 23 which through vertical shear yieldability accommodate differential equalizing movements (tilting longitudinally of the truck) with respect to the main frame 25, 27 and to each other, but through their resistance to compression prevent substantial movements of the side frames longitudinally with respect to the main frame. In addition to the vertical movement of the main frame 25, 27 on the side frames, accommodated mainly by shear in the chevron springs 21, 23, such vertical movement is yieldably resisted partly by compression in the chevron springs because of their slight inclination longitudinally of the truck. The main frame transom 25 extends outwardly of the side members 27 at both sides of the truck to form spring brackets 29, and on the latter are seated pneumatic springs comprising a bottom cylinder 31 and a concentric top cylinder 33 of substantially greater diameter than bottom cylinder 31 and connected to the latter by a flexible diaphragm 35. Springs 31, 33, 35 are connected to a source of compressed air and are vertically yieldable and horizontally yieldable transversely of the truck. They are restrained against yielding longitudinally of the truck by a pair of longitudinal links 36 disposed on opposite sides of each top cylinder 33 and are connected at one end, by universal pivots 38, to upstanding brackets 40 on frame brackets 29 and at their opposite ends by similar pivots 42 to brackets 44 on top cylinders 33. On the upper surface of spring upper cylinders 33 are seated rubber sandwich devices comprising a plurality of horizontal elastomeric pads bounded by and interleaved with metal plates 39. Pad devices 37, 39 are rectangular in plan and are elongated longitudinally of the truck. Vehicle underframe U is seated directly on pad devices 37, 39, the upper plates 39 of which are held against movement with respect to the underframe.

For transmitting longitudinal forces from the truck to the underframe and providing a swivel center of the truck, truck frame transom 25 is centrally apertured as at 41 and the underframe is provided at its center with a depending vertical post 43 of I-section with its web 45 disposed transversely of the truck. Post 43 extends through transom aperture 41. Between transverse web 45 of post 43 and the opposing transverse faces 47 of aperture 41 resilient sandwich devices, comprising a plurality of elastomeric pads 49, bounded by and interleaved by metal plates 51, all disposed transversely of the truck, are compressed. With this arrangement, longitudinal forces are transmitted between the truck frame and the underframe with substantially no relative longitudinal movement because of the resistance of resilient devices 49, 51 to compression, and swivel movements of the truck about its center are freely accommodated principally by shear yieldability of the pad devices, and to some extent by compression therein, relative lateral movements of the underframe on the truck being accommodated entirely through shear yieldability in pads 49. For limiting relative lateral movements of the underframe and truck, elastomeric bumpers 53 are mounted on brackets 55 at the sides of aperture 41, and are normally spaced a short distance from the sides of post 41, being engageable therewith when the limits of lateral motion are approached.

In order that swiveling movements, which normally require substantially greater yieldability in shear of the body supporting spring devices than do lateral movements, the truck is arranged so that lateral movements will be accommodated and yieldability resisted solely by pneumatic springs 31, 33, 35, while swivel movements are accommodated by yieldability in horizontal shear of resilient pad devices 37, 39. This is accomplished by connecting post 43 to the upper cylinders 33 of each pneumatic spring device 31, 33, 35, by transversely extending anchor links 57 which are provided at their ends with universal pivot-forming elastomeric connections 59, respectively, to upstanding brackets 61 on pneumatic spring top cylinders 33 and brackets 63 on post 43. From the foregoing it will be evident that when operating on tangent track with the truck aligned longitudinally with the car underframe, anchor links 57 will prevent any relative transverse movement between pneumatic spring top cylinders 33 and underframe U even though the underframe is permitted to move transversely of the truck frame by shear in pads 49 between post 43 and transom aperture transverse faces 47. Since pneumatic spring upper cylinder 33 can move laterally with respect to lower cylinders 31, such lateral movements will be accommodated and yieldingly resisted by the resistance of pneumatic springs 31, 33, 35 to distortion transversely, and the truck and underframe will be resiliently returned to their normal centered position through recovery of springs 31, 33, 35. During operation on curved track, however, pneumatic springs 31, 33, 35 will be prevented from yielding in shear longitudinally of the truck by longitudinal anchor links 36, but resilient pad devices 37 will be free to yield in shear longitudinally of the truck with respect to the supported underframe, thus freely accommodating swivel of the truck about post 43.

Operation of the above-described embodiment is as follows: As a vehicle mounted on trucks as described above operates along track, side frames 11 are free to tilt differentially with respect to each other without causing similar tilting of the truck frame 25, 27, 29 by reason of vertical shearing action in chevron springs 22, 23 by which the truck frame is supported on side frames 11, but by virtue of the resistance of chevron springs 21, 23 to compression longitudinally and transversely of the truck there is no substantial longitudinal or transverse movement of the truck frame with respect to side frames 11. By reason of anchors 36, longitudinal shearing movements, or axial twisting movements of pneumatic spring device top cylinders 33 with respect to bottom cylinders 31 are prevented, yet, due to the universal pivotal connections 38, 42 of anchor links 36, relative transverse shearing movements of top cylinder 33 with respect to bottom cylinder 31 are permitted. Lateral movement of the body on the truck frame, as well as vertical movement, is permitted by yielding in shear of rubber pad devices 49 between post 45 and truck frame aperture transverse surfaces 47 and such transverse movements are accommodated and yieldingly resisted through action of pneumatic spring devices 31, 33, 35. While operating on curved track, swivel of the truck is permitted through shear and compression in elastomeric pads 47, while purely longitudinal movements of the truck framing relative to post 45 are resisted by the resistance of pads 47 to compression longitudinally of the truck. Transverse anchor links 57 prevent horizontal pads 37 from yielding in shear transversely of the truck so that all transverse movements of the body on the truck frame must be accommodated and yieldably resisted by the pneumatic spring devices 31, 33, 35, while on curved track, pads 37 are free to yield longitudinally of the truck, i.e., generally about the center of the truck as a pivot axis to accommodate swivel of the truck relative to the supported body about the central axis of post 45.

Figure 5:
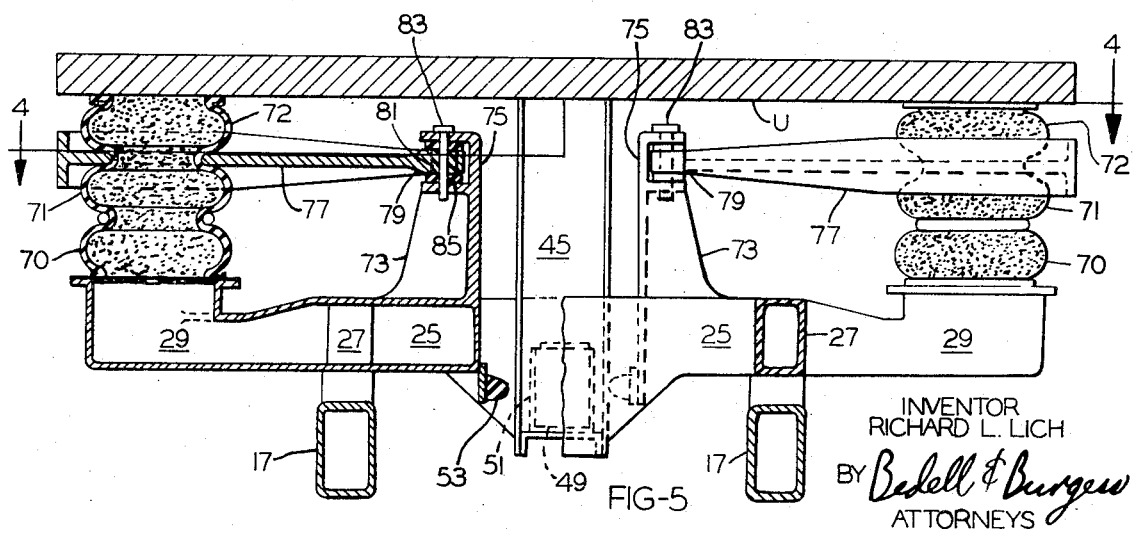
FIG. 5 is a transverse vertical sectional view along line 5–5 of FIG. 4.

In the embodiment illustrated in FIGS. 4 and 5, the truck structure other than the body support spring and lateral anchors is identical to that illustrated in FIGS. 1—3, and the same reference numerals are applicable. In the second embodiment, the body support springs are flexible-wall pneumatic cushions each having three horizontal convolutions 70, 71, 72, convolution 70 being secured to frame brackets 29 and top convolution 72 being secured to underframe U. In order that all three convolutions may yield in shear longitudinally of the truck to accommodate swivel while only one of the convolutions yields in shear to accommodate relative lateral movement of truck and body, transom 25 is formed along the side margins of aperture 41 with upstanding brackets 73 the upper ends of which are recessed as at 75 to form outwardly open clevises, and a transversely extending paddlelike anchor 77 is mounted with its inner narrow end 79 in each clevis 75. To accommodate substantial universal movement of anchors 77 in clevises 75, holes 81 in anchor ends 79 are of substantially larger diameter than pivot pins 83 which pass through the clevis and the anchor end hole, and an elastomeric bushing 85 is positioned around pin 83 in hole 81. The outer ends of paddlelike anchors 77 are enlarged sufficiently to surround air cushions 71, 72 at the intersection between top convolution 72 and middle convolution 71.

Operation of the second embodiment of the invention is as follows: During operation on straight track, all three convolutions of each spring device 70, 71, 72 are free to yield vertically because of the universal pivotal connection of anchors 77 to truck frame upstanding brackets 73, but lateral movements of the body on the truck are accommodated solely through lateral yielding of top convolution 72, bottom convolutions 70 and 71 being held against yielding transversely of the truck by anchors 77. When operating on curved track, however, all three convolutions are permitted to yield horizontally in an arc about the center of post 45 to permit the truck to swivel relative to the supported vehicle body.

It will be evident from the foregoing that during swivel movements all three convolutions 70, 71, 72 will be permitted to yield in shear longitudinally of the truck by reason of the pivotal connection of paddle like anchors 77 to truck frame upstanding brackets 73 and that vertical deflection of all three convolutions will be freely permitted by deformation of bushings 85 whereby anchors 77 are permitted to pivot freely in vertical planes. However, relative lateral movements of underframe U relative to the truck frame will be accommodated solely by yielding in shear transversely of the truck of top convolutions 72, since bottom convolutions 70 and middle convolutions 71 are held against such transverse yielding in shear by anchors 77.

The details of the trucks described herein may be modified substantially without departing from the spirit of the invention and the exclusive use of such modifications as come within the scope of the appended claims is contemplated.

I claim:

1. In a railway vehicle truck, wheeled axles, framing supported on said axles, upright spring means fixedly carried by said framing at each side of the truck and adapted for underlying securement to a vehicle body, means for connecting said framing to a supported vehicle body for permitting vertical and transverse movements and vertical-axis pivotal movements of said framing with respect to a supported vehicle body while opposing substantial longitudinal movements therebetween, each said spring means comprising a first part restrained against yielding transversely of the truck but yieldable horizontally along an arc extending longitudinally of the truck about said vertical pivot axis, and a second part in series with said first part and restrained against yielding longitudinally of the truck but yieldable horizontally transversely of the truck whereby truck swivel is accommodated by horizontal yielding of said first spring parts about the pivot axis and lateral movements of a supported vehicle body on the truck are accommodated solely by transverse yielding of said second parts.

2. In a railway vehicle truck according to claim 1, said spring means first parts being adapted for rigid connection to a vehicle body, and said spring means second parts being rigidly mounted on said truck framing.

3. In a railway vehicle truck according to claim 2, transversely extending link means adapted for connection at their inner ends to a supported vehicle body in the region of the center of the truck and at their outer ends to said spring means intermediate the first and second parts, and being universally pivotally connected thereto whereby to permit yielding of said first parts longitudinally of the truck and said second parts transversely of the truck while preventing yielding of said first parts in shear transversely of the truck.

4. In a railway vehicle truck according to claim 3, said spring means first part comprising a flat horizontal pad of elastomeric material.

5. In a railway vehicle truck according to claim 3, said spring means second part comprising an upright pneumatic cushion device.

6. In a railway vehicle truck according to claim 3, said spring means first part comprising a flat horizontal pad of elastomeric material and said spring means second part comprising an upright pneumatic cushion.

7. In a railway vehicle truck according to claim 3, link means extending longitudinally of the truck and connecting said spring means intermediate said first and second parts to said truck framing whereby to prevent yielding in shear of said spring second parts longitudinally of the truck.

8. In a railway vehicle truck according to claim 7, said last-named link means comprising separate links at both side of both said spring means whereby to prevent twisting of said second parts about their vertical axes.

9. In a railway vehicle truck according to claim 1, said spring means first part being supported directly on said truck framing and said spring means second part being adapted for connection directly to a supported vehicle body.

10. In a railway vehicle truck according to claim 9, transversely extending link means connecting said spring means intermediate said first and second parts to said truck framing and being universally pivotally connected thereto whereby to permit yielding of both said parts vertically and in shear longitudinally of the truck while preventing yielding in shear of said first part transversely of the truck.

11. In a railway vehicle truck according to claim 10, said spring device being of the pneumatic cushion type and having a plurality of convolutions, said spring means first and second parts including different convolutions.

12. In a railway vehicle truck according to claim 11, said spring means first part having more convolutions than said spring means second part.

13. In a railway vehicle truck according to claim 1, said means for connecting said truck framing to a supported vehicle body comprising a central aperture in said truck framing and having transverse vertical surfaces spaced apart longitudinally of said framing, an upright post centrally disposed within said aperture and having transverse surfaces therein spaced apart from and in opposing relation with said framing transverse faces, pad devices having transverse and vertical yieldability and lacking substantial yieldability longitudinally of the truck interposed between said post surfaces and said truck framing transverse faces, said post being adapted for connection to vehicle body structure above said truck framing.

14. In a railway vehicle truck according to claim 13, said truck framing having transversely spaced longitudinal vertical faces forming the sides of said central aperture therein and said post having longitudinal vertical surfaces in spaced opposing relation to said truck framing longitudinal surfaces, and resilient means between said opposing longitudinal surfaces of said post and said truck framing for limiting transverse movements of said truck framing with respect to said post.